United States Patent
Köhler et al.

[11] Patent Number: 5,378,749
[45] Date of Patent: Jan. 3, 1995

[54] BLENDS OF PAS, NITROARYLKETO COMPOUNDS AND MALEIC IMIDES

[75] Inventors: Burkhard Köhler; Bahman Sarabi, both of Krefeld, Germany

[73] Assignee: Bayer Aktiengesellschaft, Leverkusen, Germany

[21] Appl. No.: 120,136

[22] Filed: Sep. 10, 1993

Related U.S. Application Data

[63] Continuation of Ser. No. 916,952, Jul. 20, 1992, abandoned.

[30] Foreign Application Priority Data

Aug. 3, 1991 [DE] Germany ............................ 4125761

[51] Int. Cl.6 ............................................ C08G 75/16
[52] U.S. Cl. ...................................... 524/259; 524/92; 524/355; 525/537
[58] Field of Search .......................... 524/92, 259, 355; 525/537

[56] References Cited

U.S. PATENT DOCUMENTS

| | | | |
|---|---|---|---|
| 4,929,665 | 5/1990 | Inoue et al. | 524/500 |
| 5,086,128 | 2/1992 | Heinz et al. | 525/537 |
| 5,137,938 | 8/1992 | Kohler et al. | 525/537 |

*Primary Examiner*—Ralph H. Dean
*Assistant Examiner*—Helen F. Lee
*Attorney, Agent, or Firm*—Connolly & Hutz

[57] ABSTRACT

The invention relates to polyarylene sulfides (PAS), more particularly polyphenylene sulfides (PPS), showing reduced flash formation.

3 Claims, No Drawings

BLENDS OF PAS, NITROARYLKETO COMPOUNDS AND MALEIC IMIDES

This application is a continuation of application Ser. No. 07/916,952 filed on Jul. 20, 1992, now abandoned.

This invention relates to polyarylene sulfides (PAS), more particularly polyphenylene sulfides (PPS), showing reduced flash formation.

Polyarylene sulfides are known (cf. for example, U.S. Pat. No. 3,354,129, EP-A 1 710 021). They are inert, high-temperature-resistant thermoplastics which can be filled to a high degree, for example with glass fibers and/or other inorganic fillers. The use of these polymers, particularly polyphenylene sulfide (PPS), is increasing in fields of application hitherto reserved for thermosets.

PAS has unsatisfactory mechanical properties for certain applications in the injection molding field. In particular, its outer fiber strain and impact strength are inadequate for practical purposes. In addition, flash formation during injection molding is a problem in the processing of PPS compounds. UV stability is not optimal either.

The mechanical properties of PAS can be improved with polyisocyanates (JP-A 0 1118-572). However, the use of isocyanates is problematical for reasons of safety in use.

Novolaks are known as flow aids for PAS from DE-A 3 841 022. However, their addition does not significantly improve its mechanical properties.

Dinitro compounds are known as crosslinking reagents for PAS from DE-A 3 814 165.

Many PPS blends suffer from the problem of flash formation, i.e. the polymer melt issues from gaps in the mold during injection molding and forms flash.

Accordingly, the problem addressed by the present invention was to provide PAS and preferably PPS blends which would combine good mechanical properties and adequate flow with minimal flash formation.

Accordingly, the present invention relates to blends of
A) 99.8 to 70% by weight and preferably 99.5 to 95% by weight polyarylene sulfides, preferably polyphenylene sulfide,
B) 0.1 to 15% by weight and preferably 0.25 to 2.5% by weight nitroarylketo compounds,
C) 0.1 to 15% by weight bis- and/or polymaleic imides, preferably polymaleic imides obtainable from condensates of terephthalic dialdehyde with anilines or alkyl anilines and maleic anhydride,
D) 0 to 300% by weight, based on the sum of (A+B+C), of fillers or reinforcing materials.

Component B) may be selected, for example, from nitroarylketo compounds, for example nitrobenzaldehydes, such as o-, m- or p-nitrobenzaldehyde, o-, m- or p-nitroacetophenone or 3,3'-dinitrobenzophenone. m-Nitrobenzaldehyde is preferably used as component B).

Maleic imides based, for example, on m-phenylenediamine, p-phenylenediamine, 3,3'-diaminodiphenyl sulfone, hexamethylenediamine, 4,4'-diaminodiphenyl ether, 4,4'-diaminodiphenyl sulfide, 4,4'-diaminodiphenyl disulfide, aniline/formaldehyde condensates, aniline/terephthalic aldehyde condensates, toluidine/terephthalic dialdehyde condensates as amine component are used as component C).

Component C) is prepared, for example, by reaction of corresponding di- or polyamines with maleic anhydride and subsequent cyclization to maleic imides (for example in accordance with GB-A 1,137,592).

In addition, some of the maleic imides are commercially obtainable. For example, a maleic imide based on a toluidine/terephthalic aldehyde condensate as amine is commercially obtainable under the name of MP-2000X ® from Mitsubishi Petrochemical Co.

According to the invention, commercially available glass fibers, preferably sized with polyurethane formers or epoxy film formers and amino or epoxysilane coupling agents are used. They have a diameter of 1 to 20 $\mu$m and preferably 5 to 13 $\mu$m. Rovings in which the length of the fibers in the final blend is from 0.05 to 10 mm and preferably from 0.1 to 2 mm may be used. Rovings may also be used in processes for the production of roving-reinforced unidirectional composites.

Instead of the glass fibers, commercially available glass beads, for example Ballotini glass beads, may optionally be used, in particular partly.

Other mineral fillers or additives which may be used include, mica, talcum, silica flour, metal oxides and sulfides, for example $TiO_2$, ZnO, ZnS, graphite, carbon black, fibers, for example of quartz or carbon, carbonates, such as for example $MgCO_3$, $CaCO_3$, or sulfates, such as for example $CaSO_4$, $BaSO_4$.

Other typical additives which may be used include pigments, mold release agents, E waxes, flow aids, nucleating agents or stabilizers.

The fillers and additives may be used in a quantity of 0 to 300% by weight, based on PAS.

The blends according to the invention may be produced in the usual way by extrusion.

The blends according to the invention may be processed in the usual way to molded articles, semifinished products, circuit boards, fibers, films, profiles, etc. The blends according to the invention may generally be used with advantage for applications where thermoplastically processable compounds are used.

They are distinguished by minimal flash formation.

EXAMPLES

1. Production of the blend

The PPS used had a melt viscosity of 45 to 65 PAS (melt temperature 310° C., shear rate $10^3$ 1/s) and had been produced in accordance with EP-A 171 021.

FT 562 ® chopped strands sized with epoxy film former and epoxy silane coupling agent were used as glass fibers in a quantity of 40% by weight. The blends according to the invention were compounded in a Werner & Pfleiderer ZSK 32 twin-screw extruder at 340° C. The viscosity of the compounds was determined by capillary viscosimetry at a melt temperature of 320° C. and at a shear rate of 1/1000 s.

Rectangular test specimens measuring $80 \times 10 \times 4$ mm$^3$ were produced with the possibility of flash formation at the end of the test specimen. One and the same test specimen was used to determine the mechanical and thermal properties and to measure flash formation. The flash was formed in a 10 to 40 $\mu$m wide gap under a maximum internal mold pressure of 800 bar and at a mold surface temperature of 140° C. The mechanical were tested in regard to flexural strength, outer fiber strain (DIN 53 452) and impact strength (ISO 180 method 1C). Flash formation was measured optically using a Zeiss image analyzer with integrated microscope over the entire specimen width of 10 mm at a scanning rate of 10 $\mu$m. The mean flash length thus determined was measured on five test specimens.

Comparison Example 1

59.8% by weight PPS were blended with 40% by weight glass fibers and 0.2% by weight PE wax (PE 520 ®, a product of Hoechst).

| | |
|---|---|
| Maximum internal mold pressure: | 600 bar |
| Mold surface temperature: | 140° C. |
| Melt temperature: | 340° C. |
| Gap depth: | 490 μm |

Impact strength measures 44 kJ/m$^2$ and flash length 350 μm

Comparison Example 2

58.8% by weight PPS were blended with 40% by weight glass fibers, 1% by weight MP-2000X ® and 0.2% by weight PE wax.

Impact strength measures 52 kJ/m$^2$ and flash length 290μ.

Comparison Example 3

58.8% by weight PPS were blended with 40% by weight glass fibers, 1% by weight m-nitrobenzaldehyde and 0.2% by weight PE wax.

Impact strength measures 48 kJ/m$^2$ and flash length 270μ.

EXAMPLE 1

58.8% by weight PPS were blended with 40% by weight glass fibers, 0.5% by weight m-nitrobenzaldehyde, 0.5% by weight MP-2000X ® and 0.2% by weight PE wax.

Impact strength measures 51 kJ/m$^2$ and flash length 240 μm.

We claim:
1. A blend consisting essentially of:
   A. 99.8 to 70% by weight of polyarylene sulfide;
   B. 0.1 to 15% by weight of m-nitrobenzaldehyde; and
   C. 0.1 to 15% by weight of a maleic imide
   obtained from the reaction of maleic anhydride and a toluidine/terephthalic aldehyde condensate as amine.
2. The blend of claim 1, additionally containing a filler or reinforcing material in an amount of 0 to 300% by weight, based on weight of blend.
3. The blend of claim 1, containing 99.5 to 95% by weight of polyarylene sulfide.

* * * * *